Aug. 15, 1950      M. REISS      2,518,719

WIDE-ANGLE CAMERA OBJECTIVE

Filed Feb. 9, 1946

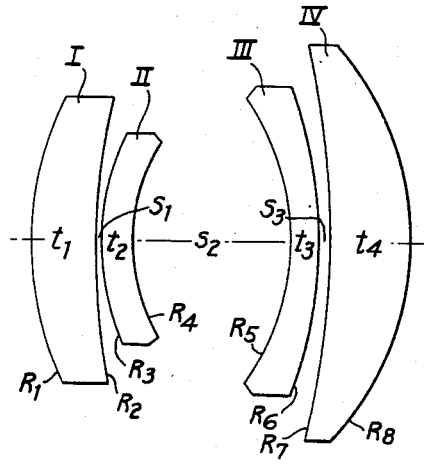

FIG. 1.

| EF = 100 mm. | | | | f/6.3 |
|---|---|---|---|---|
| LENS | $N_D$ | V | RADII | THICKNESSES |
| I | 1.611 | 57.2 | $R_1 = +24.1$ | $t_1 = 4.78$ |
| | | | $R_2 = +47.5$ | $S_1 = .63$ |
| II | 1.649 | 33.8 | $R_3 = +19.4$ | $t_2 = 2.15$ |
| | | | $R_4 = +14.0$ | $S_2 = 12.50$ |
| III | 1.649 | 33.8 | $R_5 = -18.5$ | $t_3 = 1.99$ |
| | | | $R_6 = -33.7$ | $S_3 = .80$ |
| IV | 1.611 | 58.8 | $R_7 = -69.3$ | $t_4 = 6.36$ |
| | | | $R_8 = -21.7$ | BF = 90.25 |

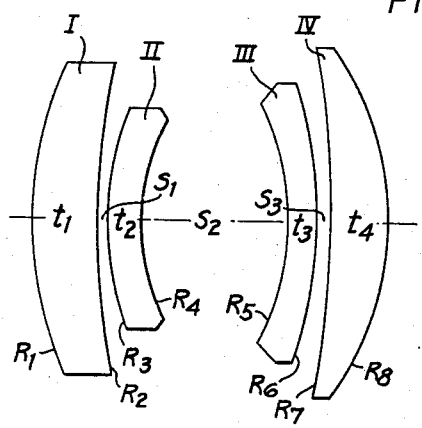

FIG. 2.

| EF = 100 mm. | | | | f/6.3 |
|---|---|---|---|---|
| LENS | $N_D$ | V | RADII | THICKNESSES |
| I | 1.620 | 60.3 | $R_1 = +24.6$ | $t_1 = 4.89$ |
| | | | $R_2 = +51.6$ | $S_1 = .65$ |
| II | 1.621 | 36.2 | $R_3 = +22.0$ | $t_2 = 2.20$ |
| | | | $R_4 = +15.2$ | $S_2 = 10.60$ |
| III | 1.605 | 38.0 | $R_5 = -16.8$ | $t_3 = 2.04$ |
| | | | $R_6 = -32.4$ | $S_3 = .81$ |
| IV | 1.620 | 60.3 | $R_7 = -63.4$ | $t_4 = 4.07$ |
| | | | $R_8 = -20.9$ | BF = 88.9 |

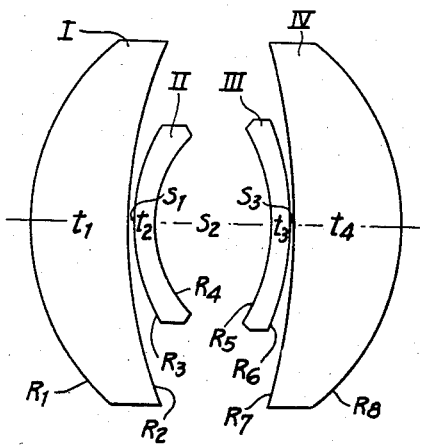

FIG. 3.

| EF = 100 mm | | | | f/8 |
|---|---|---|---|---|
| LENS | $N_D$ | V | RADII | THICKNESSES |
| I | 1.620 | 60.3 | $R_1 = +28.05$ | $t_1 = 12.16$ |
| | | | $R_2 = +61.41$ | $S_1 = .46$ |
| II | 1.649 | 33.8 | $R_3 = +22.48$ | $t_2 = 2.19$ |
| | | | $R_4 = +15.09$ | $S_2 = 14.73$ |
| III | 1.649 | 33.8 | $R_5 = -22.41$ | $t_3 = 2.19$ |
| | | | $R_6 = -32.29$ | $S_3 = .46$ |
| IV | 1.620 | 60.3 | $R_7 = -75.83$ | $t_4 = 13.63$ |
| | | | $R_8 = -28.12$ | BF = 80.5 |

MAX REISS

INVENTOR

BY *Newton M. Perrins*
*F. M. Emerson Holmes*

ATT'Y & AG'T

Patented Aug. 15, 1950

2,518,719

UNITED STATES PATENT OFFICE 2,518,719

WIDE-ANGLE CAMERA OBJECTIVE

Max Reiss, Rochester, N. Y., assignor to Eastman Kodak Company, Rochester, N. Y., a corporation of New Jersey Application February 9, 1946, Serial No. 646,687

7 Claims. (Cl. 88—57)

This invention relates to wide-angle photographic objectives.

An object of the invention is to provide an objective highly corrected for coma, distortion and image curvature over an angular field of $+40°$ or more, and with spherical aberration reduced to a small residue throughout an aperture of about f/6.3.

A type of objective which has been found very suitable for wide-angle work consists of two negative components aligned between two positive components, all the components being meniscus and concave toward the center of the objective. Usually each component consists of but a single element, although in some instances one or both of the positive components may be divided into two cemented or airspaced elements. This type of objective originated about a half century ago when an air space was introduced into each half of the so-called convertible objective, and like the parent type it is made up sometimes in a strictly symmetrical form, sometimes in two geometrically similar halves of different focal length, and sometimes in two slightly unsymmetrical halves of roughly the same focal length whereby the objective is better corrected for coma for use with very distant objects. According to the present invention, an improved wide-angle objective of this type is constructed in which each component has a very favorable shape whereby the aberrations are greatly reduced.

According to one manner of describing the invention, the front and rear surfaces of the respective four components have radii of curvature which are numerically within the ranges set forth in following table, in which these eight surfaces are numbered by subscripts in order from the front to the rear of the objective, and in which F is the focal length of the objective:

| Radii | Preferred Range |
|---|---|
| $R_1$ | 0.21 F to 0.40 F |
| $R_2$ | 0.45 F to 0.64 F |
| $R_3$ | 0.18 F to 0.28 F |
| $R_4$ | 0.12 F to 0.18 F |
| $R_5$ | 0.155 F to 0.25 F |
| $R_6$ | 0.26 F to 0.35 F |
| $R_7$ | 0.56 F to 0.90 F |
| $R_8$ | 0.205 F to 0.35 F |

These curves are particularly favorable when all the lens elements making up the four components have refractive indices between 1.60 and 1.75.

It is convenient for the covering of a wide angular field to have the components comparatively thin. On the other hand, there should be enough thickness at the edges to permit the centering and mounting of the elements economically. The total axial thickness of each positive component should be between 0.04 F and 0.16 F and that of each negative component between 0.013 F and 0.026 F, and preferably greater than .016 F. Also the negative components should be spaced apart by between 0.09 F and 0.17 F and from their respective adjacent positive components by between 0.002 F and 0.012 F.

According to a slightly different manner of describing the invention, the surfaces are defined by their dioptric powers rather than by their radii, and the powers P of the front and rear surfaces of the respective four components are numerically within the ranges set forth in the following table, in which these eight surfaces are numbered by subscripts in order from the front to the rear of the objective, and in which P without a subscript is the power of the objective:

| Powers | Preferred Range |
|---|---|
| $P_1$ | 2.04 P to 3.00 P |
| $P_2$ | 0.96 P to 1.40 P |
| $P_3$ | 2.23 P to 3.48 P |
| $P_4$ | 3.83 P to 5.80 P |
| $P_5$ | 2.70 P to 4.40 P |
| $P_6$ | 1.82 P to 2.60 P |
| $P_7$ | 0.68 P to 1.08 P |
| $P_8$ | 2.04 P to 3.30 P |

Very favorable results are obtainable, particularly when all the elements making up the four components have refractive indices between 1.59 and 1.84.

One part of the indicated range of values is in certain cases somewhat preferable. When defining the invention by the radii of curvature of the surfaces, it is preferable that $R_1 > 0.23$ F, $R_3 < 0.26$ F, $R_6 > 0.29$ F, and $R_8 < 0.32$ F. Correspondingly, when defining the invention by the powers of the surfaces, it is preferable that $P_1 < 2.8$ P, $P_3 > 2.5$ P, $P_6 < 2.1$ P and $P_8 > 2.1$ P.

According to another feature of the invention, the coma is very highly corrected by means of a moderate degree of unsymmetry introduced principally by making the fifth surface weaker than the fourth and the seventh surface weaker than the second (numbered as before). Defined in terms of radii of curvature, it is preferable that numerically $$1.02\ R_4 < R_5 < 1.65\ R_4$$

and $$1.1\ R_2 < R_7 < 1.7\ R_2$$

Or, defining this feature in terms of surface powers, it is preferred that $$0.6\ P_4 < P_5 < 0.98\ P_4$$

and $$0.6\ P_2 < P_7 < 0.9\ P_2$$

An objective according to the invention may be combined with a negative component spaced at some distance in front or with a substantially afocal unit aligned in front in known manner thereby making up an optical system which covers a still wider field than the objective alone. Or it may be combined with a flat or nearly flat plate near one or both of the principal focal planes for reducing still further the small trace of distortion in the image formed by the objective itself.

In the accompanying drawing, Figs. 1, 2 and 3 show objectives according to the invention, each with data for one embodiment.

The data is repeated in the following tables:

Example 1               Aperture=f/6.3

| Lens | N | V | Radii | Thicknesses |
|---|---|---|---|---|
| I | 1.611 | 57.2 | $R_1=+24.1$ mm. $R_2=+47.5$ | $t_1=4.78$ mm. $s_1=0.63$ |
| II | 1.649 | 33.8 | $R_3=+19.4$ $R_4=+14.0$ | $t_2=2.15$ $s_2=12.50$ |
| III | 1.649 | 33.8 | $R_5=-18.5$ $R_6=-33.7$ | $t_3=1.99$ $s_3=0.80$ |
| IV | 1.611 | 58.8 | $R_7=-69.3$ $R_8=-21.7$ | $t_4=6.36$ BF=90.25 |

Example 2               Aperture=f/6.3

| Lens | N | V | Radii | Thicknesses |
|---|---|---|---|---|
| I | 1.620 | 60.3 | $R_1=+24.6$ mm. $R_2=+51.6$ | $t_1=4.89$ mm. $s_1=0.65$ |
| II | 1.621 | 36.2 | $R_3=+22.0$ $R_4=+15.2$ | $t_2=2.20$ $s_2=10.60$ |
| III | 1.605 | 38.0 | $R_5=-16.8$ $R_6=-32.4$ | $t_3=2.04$ $s_3=0.81$ |
| IV | 1.620 | 60.3 | $R_7=-68.4$ $R_8=-20.9$ | $t_4=4.07$ BF=88.9 |

Example 3               Aperture=f/8.0

| Lens | N | V | Radii | Thicknesses |
|---|---|---|---|---|
| I | 1.620 | 60.3 | $R_1=+28.05$ mm. $R_2=+61.41$ | $t_1=12.16$ mm. $s_1=0.46$ |
| II | 1.649 | 33.8 | $R_3=+22.48$ $R_4=+15.09$ | $t_2=2.19$ $s_2=14.73$ |
| III | 1.649 | 33.8 | $R_5=-22.41$ $R_6=-32.29$ | $t_3=2.19$ $s_3=0.46$ |
| IV | 1.620 | 60.3 | $R_7=-75.83$ $R_8=-28.12$ | $t_4=13.63$ BF=80.5 |

In each case, the data, as given, corresponds to a focal length of 100 mm. Each component consists of a simple lens element, and these are numbered by Roman numerals from front to rear. The second and third columns give the corresponding refractive indices N for the D line of the spectrum and the dispersive indices V. The fourth and fifth columns give the radii of curvature R, thicknesses t, and spaces s, each numbered by subscripts in order from front to rear. The + and − signs indicate surfaces respectively convex and concave to the front, and BF is the back focal length.

The dioptric powers of the surfaces are shown in the following table as decimal fractions of the power P of the objective, and certain ratios denoting the manner of introducing asymmetry are also given:

|  | Ex. 1 | Ex. 2 | Ex. 3 |
|---|---|---|---|
| $P_1$ | 2.54 P | 2.52 P | 2.21 P |
| $P_2$ | −1.29 | −1.20 | −1.01 |
| $P_3$ | 3.34 | 2.82 | 2.88 |
| $P_4$ | −4.64 | −4.10 | −4.30 |
| $P_5$ | −3.51 | −3.60 | −2.89 |
| $P_6$ | 1.92 | 1.87 | 2.01 |
| $P_7$ | −0.88 | −0.91 | −0.82 |
| $P_8$ | 2.82 | 2.95 | 2.20 |
| $-R_5/R_4$ | 1.32 | 1.11 | 1.49 |
| $-R_7/R_2$ | 1.46 | 1.32 | 1.24 |
| $P_5/P_4$ | 0.76 | 0.88 | 0.67 |
| $P_7/P_2$ | 0.68 | 0.76 | 0.81 |

It is quite apparent from these tables that each of the three examples embodies all of the features of the invention.

Examples 1 and 2 were designed primarily for manufacture in focal lengths from 150 to about 400 mm. Example 3 was intended for manufacture in a somewhat shorter focal length, and the thicknesses are proportionately greater for more economical manufacture. Also the surfaces of the front and rear components of this objective are proportionately somewhat weaker.

In Examples 1 and 2, a slight advantage is gained by locating the diaphragm closer to the front component than the rear, but not more than twice as close.

What I claim is:

1. A photographic objective comprising two simple negative meniscus components axially aligned between two meniscus positive components, all concave toward the center of the objective, in which all lens elements making up the four components have refractive indices between 1.60 and 1.75, and in which the following relations hold:

$0.21\ F < R_1 < 0.40\ F$       $0.155\ F < R_5 < 0.25\ F$
   $0.45\ F < R_2 < 0.64\ F$       $0.26\ F < R_6 < 0.35\ F$
   $0.18\ F < R_3 < 0.28\ F$       $0.56\ F < R_7 < 0.90\ F$
   $0.12\ F < R_4 < 0.18\ F$       $0.205\ F < R_8 < 0.35\ F$ where F is the focal length of the objective and $R_1$ to $R_8$ are the radii of curvature of the front and rear surfaces of the respective four components and are numbered in order from the front to the rear of the objective and where < means "is less than" and in which the total axial thickness of each positive component is between 0.04 F and 0.16 F, that of each negative component is between 0.013 F and 0.026 F, the space between the two negative components is between 0.09 F and 0.17 F, and the space between each negative component and the adjacent positive component is between 0.002 F and 0.012 F.

2. An objective according to claim 1 in which the refractive index of at least one of the negative elements is higher than the refractive indices of the two positive elements and in which the following relations hold:

$R_1 > 0.23\ F$       $R_6 > 0.29\ F$
   $R_3 < 0.26\ F$       $R_8 < 0.32\ F$

3. A photographic objective comprising two simple negative miniscus components axially aligned between two meniscus positive components, all concave toward the center of the objective, in which all lens elements making up the four components have refractive indices between 1.59 and 1.84, and in which the following relations hold:

$2.04\ P<P_1<3.00\ P$    $0.04\ F<t_1<0.16\ F$
$0.96\ P<P_2<1.40\ P$    $0.013\ F<t_2<0.026\ F$
$2.23\ P<P_3<3.48\ P$    $0.013\ F<t_3<0.026\ F$
$3.83\ P<P_4<5.80\ P$    $0.04\ F<t_4<0.16\ F$
$2.70\ P<P_5<4.40\ P$    $0.002\ F<s_1<0.012\ F$
$1.82\ P<P_6<2.60\ P$    $0.09\ F<s_2<0.17\ F$
$0.68\ P<P_7<1.08\ P$    $0.002\ F<s_3<0.012\ F$
$2.04\ P<P_8<3.30\ P$ where P is the dioptric power and F is the focal length of the objective, $P_1$ to $P_8$ are the dioptric powers of the individual front and rear surfaces of the respective four components, $t_1$ to $t_4$ are the axial thicknesses thereof, and $s_1$ to $s_3$ are the spaces therebetween, numbered consecutively in each case from front to rear, and where < means "is less than."

4. An objective according to claim 3 in which the refractive index of at least one of the negative elements is higher than the refractive indices of the two positive elements and in which the following relations hold:

$P_1<2.8\ P$       $P_6<2.1\ P$
$P_3>2.5\ P$       $P_8>2.1\ P$

5. An objective consisting of four meniscus lens elements axially spaced and concave toward the central airspace and substantially conforming to the specifications in the following table:

| Lens | N | V | Radii | Thicknesses |
|---|---|---|---|---|
| I | 1.61 | 57 | $R_1=.24\ F$ | $t_1=.05\ F$ |
|   |      |    | $R_2=.48\ F$ | $s_1<.01\ F$ |
| II | 1.65 | 34 | $R_3=.19\ F$ | $t_2=.02\ F$ |
|    |      |    | $R_4=.14\ F$ | $s_2=.12\ F$ |
| III | 1.65 | 34 | $R_5=.18\ F$ | $t_3=.02\ F$ |
|     |      |    | $R_6=.34\ F$ | $s_3<.01\ F$ |
| IV | 1.61 | 59 | $R_7=.69\ F$ | $t_4=.06\ F$ |
|    |      |    | $R_8=.22\ F$ | | where the lens elements are numbered by Roman numerals in order from front to rear, the corresponding refractive indices N for the D line of the spectrum and the dispersive indices V are specified in the second and third columns, and the radii of curvature R, the thicknesses t and the spaces s are specified in the fourth and fifth columns, each being numbered in order from front to rear and F being the focal length of the objective.

6. An objective consisting of four meniscus lens elements axially spaced and concave toward the central airspace and substantially conforming to the specifications in the following table:

| Lens | N | V | Radii | Thicknesses |
|---|---|---|---|---|
| I | 1.62 | 60 | $R_1=.25\ F$ | $t_1=.05\ F$ |
|   |      |    | $R_2=.52\ F$ | $s_1<.01\ F$ |
| II | 1.62 | 36 | $R_3=.22\ F$ | $t_2=.02\ F$ |
|    |      |    | $R_4=.15\ F$ | $s_2=.11\ F$ |
| III | 1.60 | 38 | $R_5=.17\ F$ | $t_3=.02\ F$ |
|     |      |    | $R_6=.32\ F$ | $s_3<.01\ F$ |
| IV | 1.62 | 60 | $R_7=.68\ F$ | $t_4=.04\ F$ |
|    |      |    | $R_8=.21\ F$ | | where the lens elements are numbered by Roman numerals in order from front to rear, the corresponding refractive indices N for the D line of the spectrum and the dispersive indices V are specified in the second and third columns, and the radii of curvature R, the thicknesses t and the spaces s are specified in the fourth and fifth columns, each being numbered in order from front to rear and F being the focal length of the objective.

7. An objective consisting of four meniscus lens elements axially spaced and concave toward the central airspace and substantially conforming to the specifications in the following table:

| Lens | N | V | Radii | Thicknesses |
|---|---|---|---|---|
| I | 1.62 | 60 | $R_1=.28\ F$ | $t_1=.12\ F$ |
|   |      |    | $R_2=.61\ F$ | $s_1<.01\ F$ |
| II | 1.65 | 34 | $R_3=.22\ F$ | $t_2=.02\ F$ |
|    |      |    | $R_4=.15\ F$ | $s_2=.15\ F$ |
| III | 1.65 | 34 | $R_5=.22\ F$ | $t_3=.02\ F$ |
|     |      |    | $R_6=.32\ F$ | $s_3<.01\ F$ |
| IV | 1.62 | 60 | $R_7=.76\ F$ | $t_4=.14\ F$ |
|    |      |    | $R_8=.28\ F$ | | where the lens elements are numbered by Roman numerals in order from front to rear, the corresponding refractive indices N for the D line of the spectrum and the dispersive indices V are specified in the second and third columns, and the radii of curvature R, the thicknesses t and the spaces s are specified in the fourth and fifth columns, each being numbered in order from front to rear and F being the focal length of the objective.

MAX REISS.

REFERENCES CITED

The following references are of record in the file of this patent:

UNITED STATES PATENTS

| Number | Name | Date |
|---|---|---|
| 759,537 | Martin | May 10, 1904 |
| 2,031,792 | Richter | Feb. 25, 1936 |
| 2,383,115 | Durrand | Aug. 21, 1945 |

FOREIGN PATENTS

| Number | Country | Date |
|---|---|---|
| 420,825 | Germany | Oct. 31, 1925 |
| 329,350 | Great Britain | May 16, 1930 |
| 487,453 | Great Britain | June 21, 1938 |